W. W. SPADONE.
BELT.
APPLICATION FILED MAY 26, 1916.
1,279,601. Patented Sept. 24, 1918.
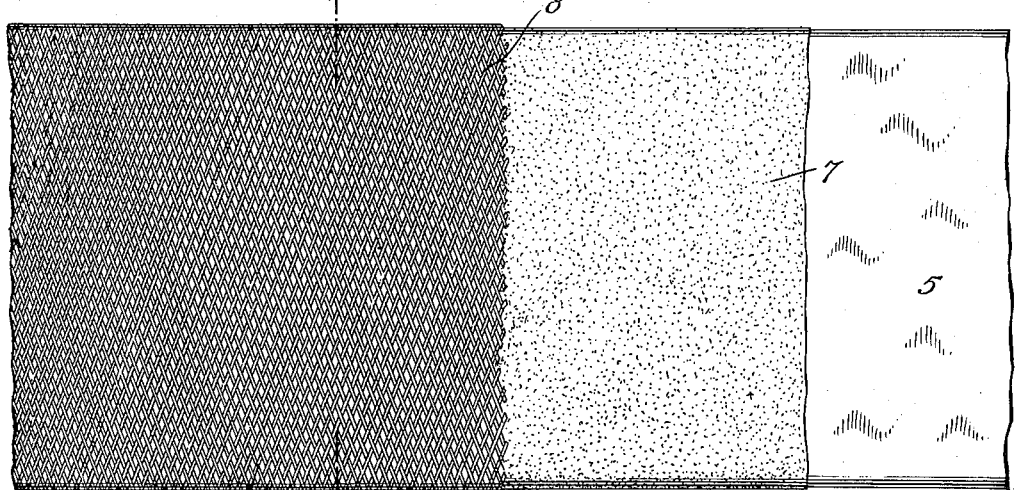
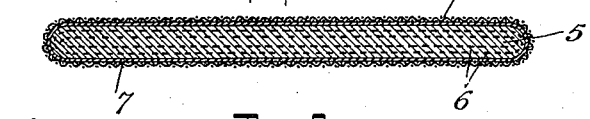
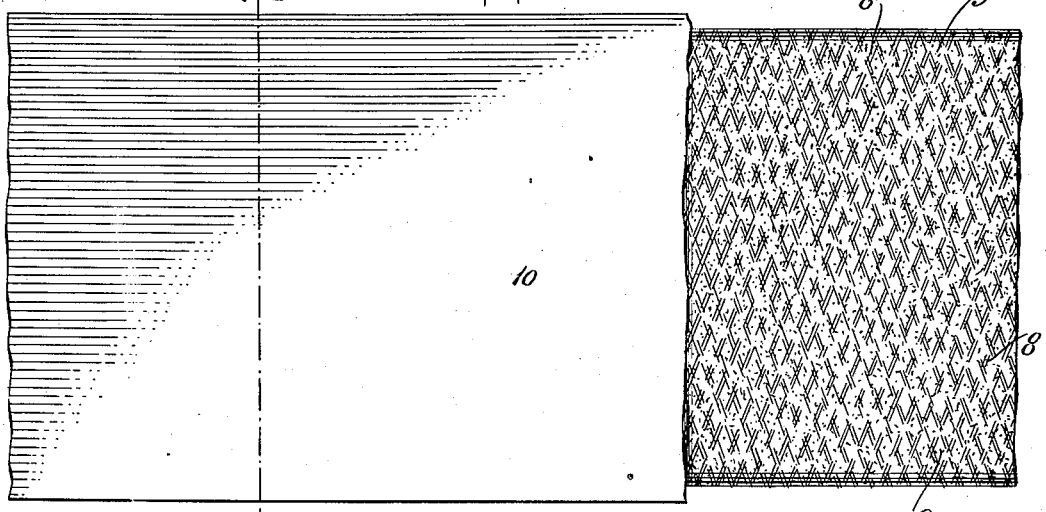
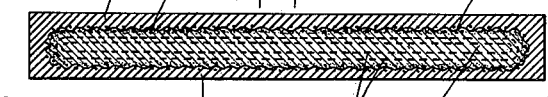
WITNESSES
George Du Bon
Jno. A Kehlenbeck
INVENTOR
Walter W. Spadone
BY
ATTORNEYS

UNITED STATES PATENT OFFICE.

WALTER W. SPADONE, OF BROOKLYN, NEW YORK, ASSIGNOR TO THE GUTTA PERCHA & RUBBER MFG. CO., OF NEW YORK, N. Y., A CORPORATION OF NEW YORK.

BELT.

1,279,601.     Specification of Letters Patent.     Patented Sept. 24, 1918.

Application filed May 26, 1916. Serial No. 99,929.

*To all whom it may concern:*

Be it known that I, WALTER W. SPADONE, a citizen of the United States, and resident of the borough of Brooklyn, county of Kings, city and State of New York, have invented certain new and useful Improvements in Belts, of which the following is a specification.

My invention relates to belts such as are used as conveyers or elevators or as means for transmitting power and has to do more particularly with that type of such belts commonly known as rubber belts. The object of my improvement is to provide a construction in which the component parts of the belt are efficiently maintained in the form of a unit, and whereby opening of the seams of the fabric layers forming part of the belt is prevented and which increases the life of a given belt materially over existing and usual constructions without being complicated or difficult to manufacture. My improvement will be fully described hereinafter and the features of novelty will be pointed out in the appended claims.

In the accompanying drawings which illustrate an example of my improvement Figure 1 is a face view of a portion of my improved belt in the process of construction and with parts broken away; Fig. 2 is a cross-section thereof on the line 2—2 of Fig. 1; Fig. 3 is a face view of the finished belt with parts broken away and Fig. 4 is a cross-section thereof on the line 4—4 of Fig. 3.

The body 5 of the belt may be constructed in any suitable manner to form an inner core and as shown comprises a plurality of plies 6 of duck or other suitable fabric united by means of rubber or the like in the usual manner to form a unit. This body 5 while in an uncured or unvulcanized state is covered with a relatively thin layer or coating 7 of rubber or rubber compound also unvulcanized and the whole, still in its uncured condition is passed, in flat form, through a braiding machine of suitable construction whereby the covering of braided fabric 8 is applied as shown in Figs. 1 and 2. The braided cover 8 is caused to firmly adhere to the body 5 by the coating 7 and is covered with rubber cement 9 in any suitable manner as by passing the combined body and braided cover through a rubber cement bath. This rubber cement 9 fills the interstices of the braided cover 8 and also covers the same, the said cover 8 in addition absorbing some of said cement and thus becoming impregnated therewith, it being understood that said cement 9 unites with the coating 7 through the interstices of said braided cover 8 and thus firmly unites the same with said body 5. After the cement 9 has been applied, the belt is subjected to a drying operation for instance by being passed over a steam table whereby the cement 9 and coating 7 are caused to dry. The unit so far produced is then calendered for instance by passing it between suitable rolls which press the cement into the braided cover 8 and at the same time firmly press the cement 9 and coating 7 together and firmly unite the braided cover with the body 5 so that the belt at this time has about the appearance indicated at the right hand end of Fig. 3. If the belt is designed for conveying and elevator purposes as shown in the illustrated example, the cushion cover 10 of unvulcanized rubber or rubber compound is placed all around the belt so as to completely envelop the unit previously produced. If the belt is intended for transmission purposes or for any other special work an outer cover of a form best suited for the particular case in hand is combined with the unit instead of the particular cushion cover 10 shown in the illustration. The type of outer cover is always predetermined by the uses for which the finished belt is intended. In any case after the cover 10 has been applied the belt is placed for instance in a hydraulic belt press and subjected to great pressure and at the same time the whole is vulcanized it being understood that any usual vulcanizing press suitable for the intended purpose may be used. The vulcanization process results in combining all of the elements into a unit and brings the belt to a finished condition.

It will be seen that in the finished product the braided cover 8 is located between the foundation or body 5 of the belt and the outer cover 10 thereof and by virtue of its character serves to firmly unite the outer cover 10 to said body 5. At the same time said braided cover 8 binds the inner portions of the belt together in an envelop as it were, and thus produces an internal unit of maximum strength and serviceability. In addition to this the braided cover 8 prevents opening of the seams in the plies of fabric and thus overcomes one of the most serious objections and disadvantages commonly present in belts of the present type. The braided cover 8 also provides an additional wearing surface and by being interposed between the outer cover and the body of the belt prevents wear upon the internal unit 5 even after the outer cover 10 has been worn through, thus increasing the life of the belt materially.

My improvement is simple, does not complicate the manufacture of the belt and does not add materially to the cost of the production thereof but increases the efficiency of the belt to a very great extent.

Various changes in the form shown and described may be made within the scope of the claims without departing from the spirit of my improvement.

I claim:—

1. A belt comprising an inner core or body, an outer cover, and a layer of braided material between said core and outer cover, the latter extending inwardly through the interstices of said braided material.

2. A belt comprising an inner core or body, an outer cover, and an envelop of braided fabric between said outer cover and core completely inclosing the latter, said outer cover extending inwardly through the interstices of said braided fabric.

3. A belt comprising a core or body, a coating of rubber thereon, a braided cover upon said coating and an outer cover upon said braided cover, and extending through the interstices thereof into contact with said rubber coating.

4. A belt comprising a core or body, a coating of rubber thereon, a braided cover upon said coating, a coating of rubber cement upon said braided cover and extending through the interstices thereof into contact with said rubber coating and an outer cover located exteriorly of said braided cover.

5. A belt comprising an inner core composed of a combination of fabric plies and rubber, a layer of rubber upon said inner core, an envelop of braided fabric completely inclosing said core, a coating of rubber cement upon said envelop and extending through the interstices thereof into contact with said layer, and an outer cover located exteriorly of said braided envelop, said layer and said coating and connected thereby with said core.

In testimony whereof I have hereunto set my hand.

WALTER W. SPADONE.